United States Patent [19]

Pham van Cang

[11] 4,007,483
[45] Feb. 8, 1977

[54] CIRCUIT FOR PROCESSING A COLOR TELEVISION SIGNAL PRIOR TO MAGNETIC RECORDING AND CORRESPONDING RESTORING CIRCUIT

[75] Inventor: Luc Pham van Cang, Paris, France

[73] Assignee: Thomson-CSF, Paris, France

[22] Filed: Dec. 22, 1975

[21] Appl. No.: 643,038

[30] Foreign Application Priority Data

Dec. 24, 1974 France .............................. 74.42637

[52] U.S. Cl. .................................................. 358/4
[51] Int. Cl.[2] ......................................... H04N 5/785
[58] Field of Search .................. 358/8, 4, 21, 40; 360/24, 33

[56] References Cited

UNITED STATES PATENTS

| | | | |
|---|---|---|---|
| 3,234,323 | 2/1966 | Kihara | 358/4 |
| 3,581,007 | 5/1971 | Cassagne | 358/4 |
| 3,728,475 | 4/1973 | Inoue et al. | 358/4 |

Primary Examiner—Robert L. Griffin
Assistant Examiner—Mitchell Saffian
Attorney, Agent, or Firm—Cushman, Darby & Cushman

[57] ABSTRACT

In a processing circuit of the type using pre-emphasis of the composite color television signal and frequency modulation, an amplitude compressor is used for selectively compressing the higher portion including the chrominance sub-carrier, of the frequency spectrum of the composite signal, prior to pre-emphasis of the latter.

4 Claims, 3 Drawing Figures

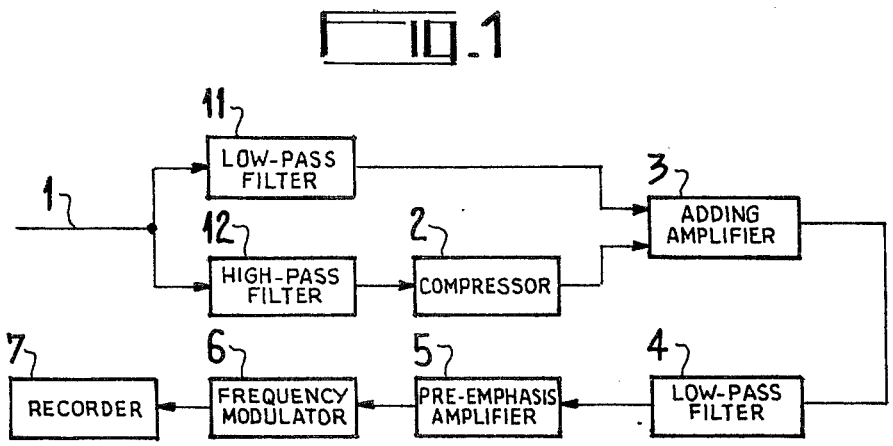
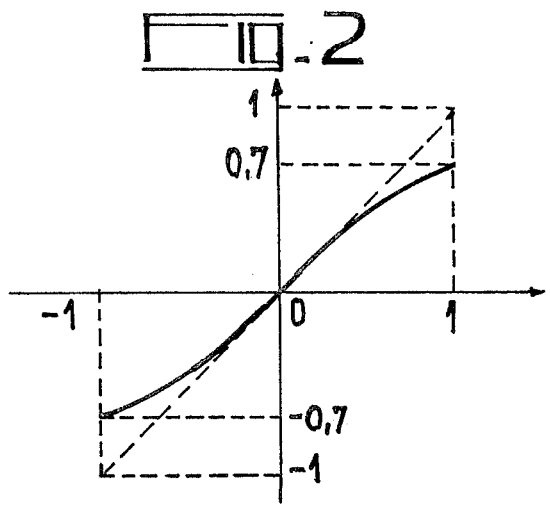
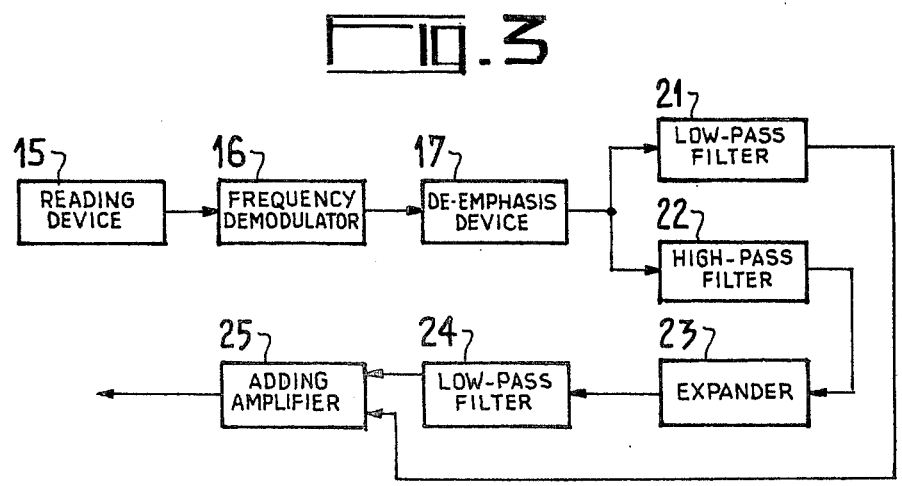

CIRCUIT FOR PROCESSING A COLOR TELEVISION SIGNAL PRIOR TO MAGNETIC RECORDING AND CORRESPONDING RESTORING CIRCUIT

The present invention relates to a processing circuit for processing a composite color television signal, prior to the magnetic recording thereof, and to a corresponding restoring circuit.

The pre-emphasis introduces a substantial improvement in the signal-to-noise ratio, but the presence of the chrominance sub-carrier introduces a limitation on the modulation index and/or the pre-emphasis ratio, within the values which are desirable in this context, if distortions are to be avoided. These defects develop the more readily the closer the resting frequency $F_o$ of the wave frequency modulated by the signal is to the frequency of the chrominance sub-carrier, something which has led to increasing this frequency $F_o$ (so-called "high-band" and "super high band" systems), but this measure is not of itself sufficient to overcome the indicated drawback.

The object of the present invention is to provide a remedy to this problem.

According to the invention, there is provided a circuit for processing a composite color television signal prior to the magnetic recording thereof, said circuit comprising: filtering means for splitting said signal into two adjacent frequency bands, comprising a lower frequency-band, and a higher frequency-band including the chrominance sub-carrier, said filtering means having first and second outputs for respectively delivering said lower and higher frequency bands; amplitude compressor means having an input coupled to said second output, and an output, an adder having two inputs respectively coupled to said first output and to said compressor means output, and an output; a pre-emphasis device having an output coupled to said adder output, and an output; and a frequency modulator having an input coupled to said output of said pre-emphasis device.

According to the invention there is further provided a restoring circuit for restoring a composite color television signal processed by means of a processing circuit as defined hereinabove, said restoring circuit comprising: in series, a frequency demodulator, a de-emphasis device, and filtering means, having first and second outputs, for splitting the signal from said pre-emphasis device into a lower frequency band, and a higher frequency band including the chrominance sub-carrier of said composite colour television signal, and directing said lower frequency band to its said first output and said higher frequency band to its said second output; expander means having an input coupled to said second output, and an output; and an adder having two inputs respectively coupled to said first output and to said output of said expander means.

The invention will be better understood and other of its features rendered apparent from a consideration of the ensuing description and the related drawings in which:

FIG. 1 is a diagram of a processing circuit in accordance with the invention;

FIG. 2 is an amplitude compression curve;

FIG. 3 is a diagram of a restoring circuit in accordance with the invention.

In FIG. 1, an input 1 supplies a color television signal for recording, this signal in the present example having been assumed to be a PAL system signal with a 4.43 MHz sub-carrier. The input 1 supplies two complementary filters 11 and 12 the first of which is a low-pass filter with a cut-off frequency of 3.5 MHz, and the second a high-pass filter having the same cut-off frequency, said frequency corresponding substantially to the lower limit of the frequency band occupied by the sub-carrier.

The filter 12 supplies an amplitude compressor 2 whose characteristic is shown in FIG. 2. The compression ratio which is zero at the origin reaches 0.7 at the substantially maximum amplitude 1 of the input signal to the compressor. The compressor may for example be a diode compressor.

The compressor 2 and the filter 11 supply the two inputs of an adding amplifier 3. The latter is followed by a low-pass filter 4 whose cut-off frequency is slightly higher than the band of the composite color signal, this eliminating the parasitic harmonics created by non-linear compression. The low-pass filter 4 is connected to the input of a pre-emphasis amplifier 5 whose output is connected to the modulating input of a frequency modulator 6. The output of the modulator is designed to be connected to the recording head of a magnetic recorder 7.

The elements 5, 6 and 7 are of prior art kind and may form part of a known kind of magnetic recording device. Due to the fact that the non-linear modulation is imparted prior to pre-emphasis, the invention, may, if desired, be applied to this kind of recording device without modifying same.

It is then possible to use an input signal having a higher level than the device would otherwise allow where acceptable distortion levels are concerned.

FIG. 3 illustrates the device for restoring a signal processed by means of the processing circuit of FIG. 1.

A reading device 15 supplies a frequency demodulator 16 followed by a de-emphasis device 17 whose output feeds two filters 21 and 22 respectively identical to those 11 and 12 of FIG. 1. The filter 22 supplies an expander 23 producing a transformation which is the reverse of that produced by the compressor, for example a diode expander. Expander 23 is followed by a filter 24 which eliminates the parasitic harmonics produced by the expansion operation, but this filter may be omitted if the equipment comprises a low-pass filter which can perform the same function prior to the monitoring and load outputs as is generally the case.

The output signal from the filter 24 and that from the filter 21 are added in an amplifying adder 25 whose output reconstitutes the color television signal.

It should be pointed out that in order to take account of the harmonics eliminated by the filters 4 and 24 (odd harmonics in the case of a symmetrical compression characteristic), the characteristic of the expander should not be strictly the reverse of that of the compressor. The correction to be made to one or the other of these characteristics, so that the two operations compensate each other, is performed in accordance with methods well known in the art of compression-expansion techniques.

It will be observed that the non-linear modulation could also be applied to the central components of the luminance signal, by shifting towards lower frequencies, for example down to 2 or 2.5 MHz, the common cut-off frequency of the complementary filters. Experience shows, however, that this only yields a small improvement for the acceptable de-emphasis ratio.

Of course, the invention is not limited to the embodiments described and shown which were given solely by way of example.

What is claimed is:

1. A circuit for processing a composite color television signal prior to the magnetic recording thereof, said circuit comprising: filtering means for splitting said signal into two adjacent frequency bands, comprising a lower frequency band, and a higher frequency band including the chrominance sub-carrier, said filtering means having first and second outputs for respectively delivering said lower and higher frequency bands; amplitude compressor means having an input coupled to said second output, and an output; an adder having two inputs respectively coupled to said first output and to said compressor means output, and an output; a pre-emphasis device having an input coupled to said adder output, and an output; and a frequency modulator having an input coupled to said output of said pre-emphasis device.

2. A processing circuit as claimed in claim 1, wherein said filtering means comprise first and second filters having a commong cut-off freqency lying between 2 and 3.5 MHz.

3. A restoring circuit for restoring a composite color television signal from a signal frequency-modulated by a modulating signal resulting from splitting said color television signal into a lower frequency band and a higher frequency band, the latter including the chrominance sub-carrier, amplitude compressing said higher frequency band, adding said lower frequency band and the amplitude compressed higher frequency band, pre-emphasizing the signal resulting from this addition, and applying to a frequency modulator the signal resulting from this pre-emphasizing, said restoring circuit comprising: in series, a frequency demodulator, a de-emphasis device, and filtering means, having first and second outputs, for splitting the signal from said pre-emphasis device into said lower frequency band and said amplitude compressed higher frequency band, and directing said lower frequency band to its said first output and said amplitude compressed higher frequency band to its said second output; expander means having an input coupled to said second output, and an output; and an adder having two inputs respectively coupled to said first output and to said output of said expander means.

4. A restoring circuit as claimed in claim 3, wherein said filtering means comprise first and second filters having a common cut-off frequency lying between 2 and 3.5 MHz.

* * * * *